US010829017B2

(12) United States Patent
Line et al.

(10) Patent No.: US 10,829,017 B2
(45) Date of Patent: Nov. 10, 2020

(54) SELF-ADJUSTING REAR SEAT CUSHION FOR COMFORT AND STORAGE

(71) Applicant: Ford Global Technologies, LLC, Dearborn, MI (US)

(72) Inventors: Johnathan Andrew Line, Northville, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 15/937,633

(22) Filed: Mar. 27, 2018

(65) Prior Publication Data

US 2018/0215298 A1 Aug. 2, 2018

Related U.S. Application Data

(62) Division of application No. 14/725,595, filed on May 29, 2015, now Pat. No. 9,963,058.

(51) Int. Cl.
*B60N 2/62* (2006.01)
*B60N 2/70* (2006.01)
*B60N 2/90* (2018.01)
*B60N 2/36* (2006.01)
*B60N 2/30* (2006.01)
(Continued)

(52) U.S. Cl.
CPC ............. *B60N 2/7064* (2013.01); *B60N 2/36* (2013.01); *B60N 2/707* (2013.01); *B60N 2/7082* (2013.01); *B60N 2/914* (2018.02); *A47C 1/126* (2013.01); *B60N 2/20* (2013.01); *B60N 2/3011* (2013.01); *B60N 2/3013* (2013.01); *B60N 2/3065* (2013.01); *B60N 2/62* (2013.01); *B60N 2002/363* (2013.01)

(58) Field of Classification Search
CPC ............. B60N 2/36; B60N 2/62; B60N 2/914
USPC ............. 297/378.1, 15, 331, 378.12, 378.14, 297/284.11
See application file for complete search history.

(56) References Cited

U.S. PATENT DOCUMENTS

| 3,235,308 A | 2/1966 | Conner |
|---|---|---|
| 3,635,524 A | 1/1972 | Faust |
| 3,792,501 A | 2/1974 | Kery |

(Continued)

FOREIGN PATENT DOCUMENTS

JP 59075842 A * 4/1984 ............... B60N 2/62

*Primary Examiner* — Syed A Islam
(74) *Attorney, Agent, or Firm* — David Coppiellie; Price Heneveld LLP (57) ABSTRACT

A vehicle seating assembly having a seat including a support frame. A seatback is pivotally coupled with the seat and is adjustable between a passenger support position configured to support the weight of a passenger and a cargo position. The seatback is folded forward to a substantially horizontal position. A seat cushion includes a dynamic forward portion and a generally static rearward portion. An articulation feature is disposed below the forward portion of the seat cushion. The articulation feature is operable between a deployed and a non-deployed position. Movement to the deployed position results in the dynamic forward portion of the seat cushion being adjusted to a raised position. Movement to the non-deployed position results in the dynamic forward portion of the seat cushion being adjusted to a lowered position that allows the seatback to fold forward to the cargo position.

9 Claims, 8 Drawing Sheets

(51) Int. Cl.
*A47C 1/126* (2006.01)
*B60N 2/20* (2006.01)

(56) References Cited

U.S. PATENT DOCUMENTS

| | | | |
|---|---|---|---|
| 3,848,845 A | 11/1974 | Bogart | |
| 4,165,126 A | 8/1979 | Strien et al. | |
| 4,324,431 A | 4/1982 | Murphy et al. | |
| 4,334,709 A | 6/1982 | Akiyama et al. | |
| 4,541,669 A | 9/1985 | Goldner | |
| 4,615,563 A * | 10/1986 | Kobayashi | A47C 7/467 |
| | | | 297/284.6 |
| 4,623,192 A * | 11/1986 | Koide | B60N 2/4221 |
| | | | 297/284.11 |
| 4,629,248 A | 12/1986 | Mawbey | |
| 4,773,703 A | 9/1988 | Krügener et al. | |
| 4,775,185 A | 10/1988 | Scholin et al. | |
| 4,792,186 A * | 12/1988 | Benjamin | A47C 7/467 |
| | | | 297/284.6 |
| 4,915,447 A | 4/1990 | Shovar | |
| 5,082,326 A | 1/1992 | Sekido et al. | |
| 5,171,062 A | 12/1992 | Courtois | |
| 5,362,128 A | 11/1994 | Wildern, IV | |
| 5,366,272 A | 11/1994 | Lebrun | |
| 5,584,532 A | 12/1996 | Marechal | |
| 5,599,062 A | 2/1997 | Hagedorn et al. | |
| 5,607,204 A | 3/1997 | Gryp | |
| 5,622,406 A | 4/1997 | Meschkat et al. | |
| 5,733,005 A | 3/1998 | Aufrere et al. | |
| 5,908,220 A | 6/1999 | Bauer et al. | |
| 6,053,575 A | 4/2000 | Bauer et al. | |
| 6,106,063 A | 8/2000 | Dauphin | |
| 6,109,693 A | 8/2000 | Bauer et al. | |
| 6,189,971 B1 | 2/2001 | Witzig | |
| 6,375,261 B1 | 4/2002 | Link | |
| 6,386,633 B1 | 5/2002 | Newton | |
| 6,402,245 B1 | 6/2002 | Newton et al. | |
| 6,419,317 B1 | 7/2002 | Westrich et al. | |
| 6,428,102 B1 | 8/2002 | Becker et al. | |
| 6,454,353 B1 | 9/2002 | Knaus | |
| 6,540,295 B1 | 4/2003 | Saberan et al. | |
| 6,601,918 B2 | 8/2003 | Mattsson | |
| 6,814,406 B2 | 11/2004 | Ito et al. | |
| 7,108,322 B2 | 9/2006 | Erker | |
| 7,192,087 B2 | 3/2007 | Adragna et al. | |
| 7,497,462 B2 | 3/2009 | Sakai et al. | |
| 7,571,964 B2 | 8/2009 | Taniguchi et al. | |
| 7,578,554 B2 | 8/2009 | Lee et al. | |
| 7,597,398 B2 | 10/2009 | Lindsay | |
| 7,648,202 B2 | 1/2010 | Bokelmann et al. | |
| 7,669,928 B2 | 3/2010 | Snyder | |
| 7,669,929 B2 | 3/2010 | Simon et al. | |
| 7,758,121 B2 | 7/2010 | Browne et al. | |
| 7,997,648 B2 | 8/2011 | Becker et al. | |
| 8,128,167 B2 | 3/2012 | Zhong et al. | |
| 8,408,646 B2 | 4/2013 | Harper et al. | |
| 8,485,583 B2 | 7/2013 | Mather et al. | |
| 8,651,550 B2 | 2/2014 | Mather et al. | |
| 9,050,914 B2 * | 6/2015 | Hage-Hassan | B60N 2/3045 |
| 9,527,417 B2 * | 12/2016 | Dry | B60N 2/58 |
| 9,550,439 B2 * | 1/2017 | Dry | B60N 2/914 |
| 2001/0004164 A1 | 6/2001 | Mattsson | |
| 2005/0088026 A1 | 4/2005 | Padberg et al. | |
| 2007/0090673 A1 | 4/2007 | Ito | |
| 2007/0132293 A1 | 6/2007 | Moriyama et al. | |
| 2008/0157577 A1 | 7/2008 | Lindsay | |
| 2008/0157578 A1 | 7/2008 | Snyder | |
| 2008/0191531 A1 | 8/2008 | Hoffmann | |
| 2008/0191532 A1 | 8/2008 | Wain | |
| 2008/0231099 A1 | 9/2008 | Szczepkowski et al. | |
| 2009/0033134 A1 | 2/2009 | Hofmann et al. | |
| 2009/0091172 A1 | 4/2009 | Kim | |
| 2009/0152920 A1 | 6/2009 | Gumbrich et al. | |
| 2009/0174242 A1 | 7/2009 | Kohl et al. | |
| 2009/0200848 A1 | 8/2009 | Kubler et al. | |
| 2009/0206643 A1 | 8/2009 | Yamamoto | |
| 2009/0212611 A1 | 8/2009 | Gloriosa | |
| 2011/0062761 A1 | 3/2011 | Seibold et al. | |

* cited by examiner

FIG. 11

SELF-ADJUSTING REAR SEAT CUSHION FOR COMFORT AND STORAGE

CROSS-REFERENCE TO RELATED APPLICATION

The present application is a divisional of U.S. patent application Ser. No. 14/725,595, filed on May 29, 2015, now U.S. Pat. No. 9,963,058, entitled "SELF-ADJUSTING REAR SEAT CUSHION FOR COMFORT AND STORAGE," for which the entire disclosure of which is hereby incorporated herein by reference.

FIELD OF THE DISCLOSURE

The present invention generally relates to a seat cushion for a vehicle, and more particularly relates to a self-adjusting rear seat cushion for a vehicle.

BACKGROUND OF THE DISCLOSURE

Seating assemblies for vehicles are increasingly becoming more adapted for occupant comfort in a variety of vehicle environments and for a number of driver and passenger preferences. These same seating assemblies frequently include increased versatility to create additional options in the way of cargo space.

SUMMARY OF THE DISCLOSURE

According to one aspect of the present disclosure, a vehicle seating assembly has a seat supported on a support frame. A seatback is pivotally coupled with the seat and is adjustable between a passenger support position configured to support the weight of a passenger and a cargo position. The seatback is folded forward to a substantially horizontal position. A seat cushion includes a dynamic forward portion and a generally static rearward portion. An articulation feature is disposed below the forward portion of the seat cushion. The articulation feature is operable between a deployed and a non-deployed position. Movement to the deployed position results in the dynamic forward portion of the seat cushion being adjusted to a raised position. Movement to the non-deployed position results in the dynamic forward portion of the seat cushion being adjusted to a lowered position that allows the seatback to fold forward to the cargo position. The articulation feature includes a polymeric composite support that is elastically deformable to the non-deployed position under the weight of the seatback when the seatback is in the cargo position.

According to another aspect of the present disclosure, a vehicle seating assembly includes a seatback pivotally coupled with a seat and adjustable between a passenger support position and a cargo position. A seat cushion includes a forward portion that is vertically adjustable between a raised position when the seatback is in the passenger support position and a lowered position when the seatback is in the cargo position.

According to yet another aspect of the present disclosure, a vehicle seating assembly includes a seatback pivotally coupled with a seat and adjustable between a passenger support position and a cargo position. A seat cushion includes a dynamic forward portion. The forward portion is supported by a flexible articulation member that is vertically adjustable between a raised position when the seatback is in the passenger support position, and a lowered position when the seatback is in the cargo position.

According to still another aspect of the present disclosure, a vehicle seating assembly includes a seat and a seatback pivotally coupled with the seat. The seatback is operably coupled between a passenger support position, wherein a passenger is supported on the vehicle seating assembly during travel, and a cargo position, wherein the seatback is rotated forward to a horizontal or nearly horizontal position to support cargo disposed on a rear face of the seatback. A seat cushion is positioned on the seat and includes a dynamic forward portion configured to accommodate an upper portion of the seatback when the seatback is rotated to the horizontal or nearly horizontal position. The dynamic forward portion provides support to the underside of the legs of a passenger when in the passenger support position, and moves to a lowered position to accommodate the upper seatback when in the cargo position. The resulting vehicle seating assembly provides a comfortable vehicle seat, and at the same time, includes exceptional versatility allowing for easy transportation of cargo in the vehicle.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
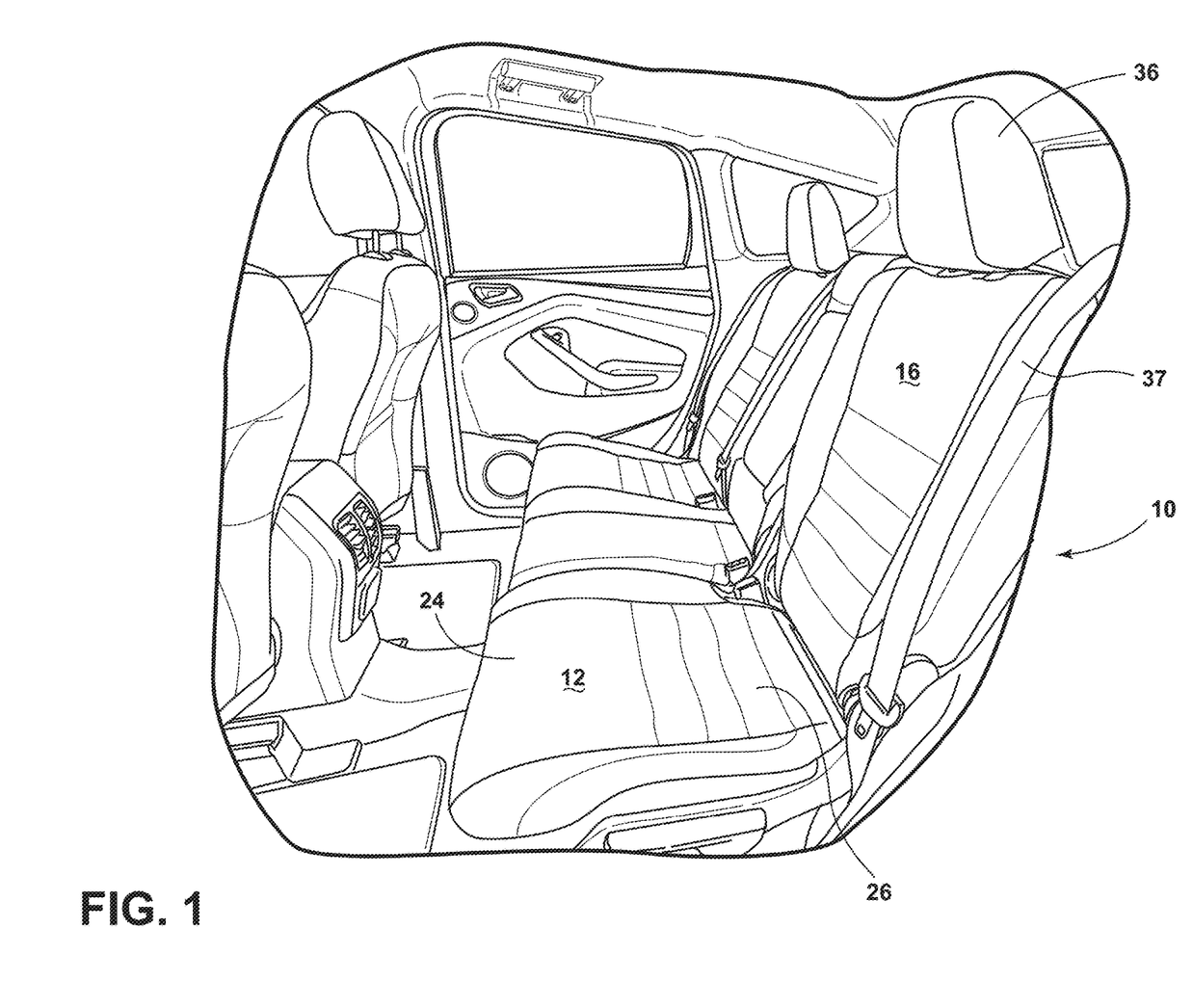
FIG. 1 is a top perspective view of one embodiment of a rear seat of a vehicle.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-10, reference numeral 10 generally designates a vehicle seating assembly having a seat 12 including a support frame 14. A seatback 16 is pivotally coupled with the seat 12 and is adjustable between a passenger support position 18 configured to support the weight of a passenger and a cargo position 20 wherein the seatback 16 is folded forward to a substantially horizontal position. A seat cushion 22 includes a dynamic forward portion 24 and a generally static rearward portion 26. An articulation feature 30 is disposed below the forward portion 24 of the seat cushion 22. The articulation feature 30 is operable between a deployed position 32 and a non-deployed position 34. Movement to the deployed position 32 results in the dynamic forward portion 24 of the seat cushion 22 being adjusted to a raised position. Movement to the non-deployed position 34 results in the dynamic forward portion 24 of the seat cushion 22 being adjusted to a lowered position that allows the seatback 16 to fold forward to the cargo position 20.

Figure 2:
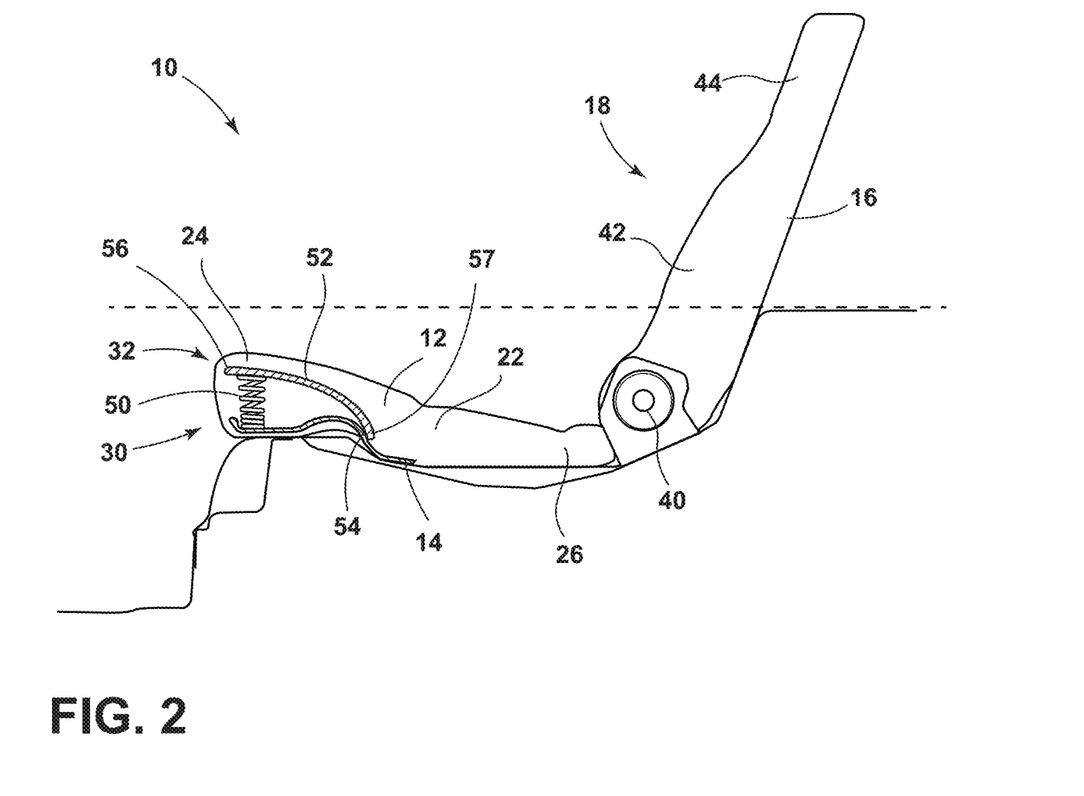
FIG. 2 is a side elevational view of a vehicle seating assembly with a seatback in a passenger support position and an articulation feature in a deployed position.
Figure 2A:
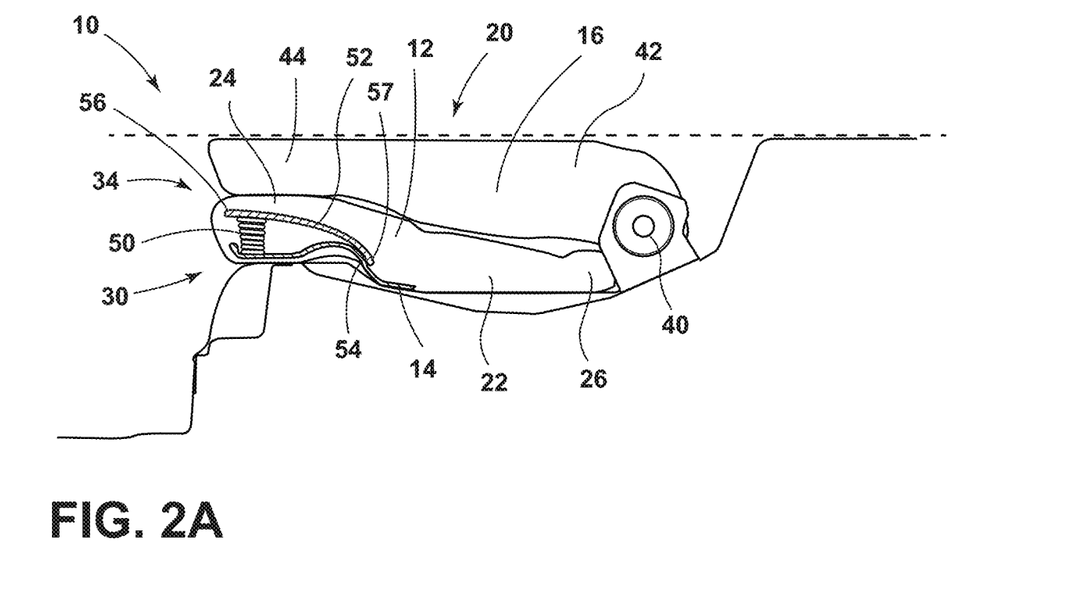
FIG. 2A is a side elevational view of a vehicle seating assembly with a seatback in a cargo position and an articulation feature in a non-deployed position.
Figure 3:
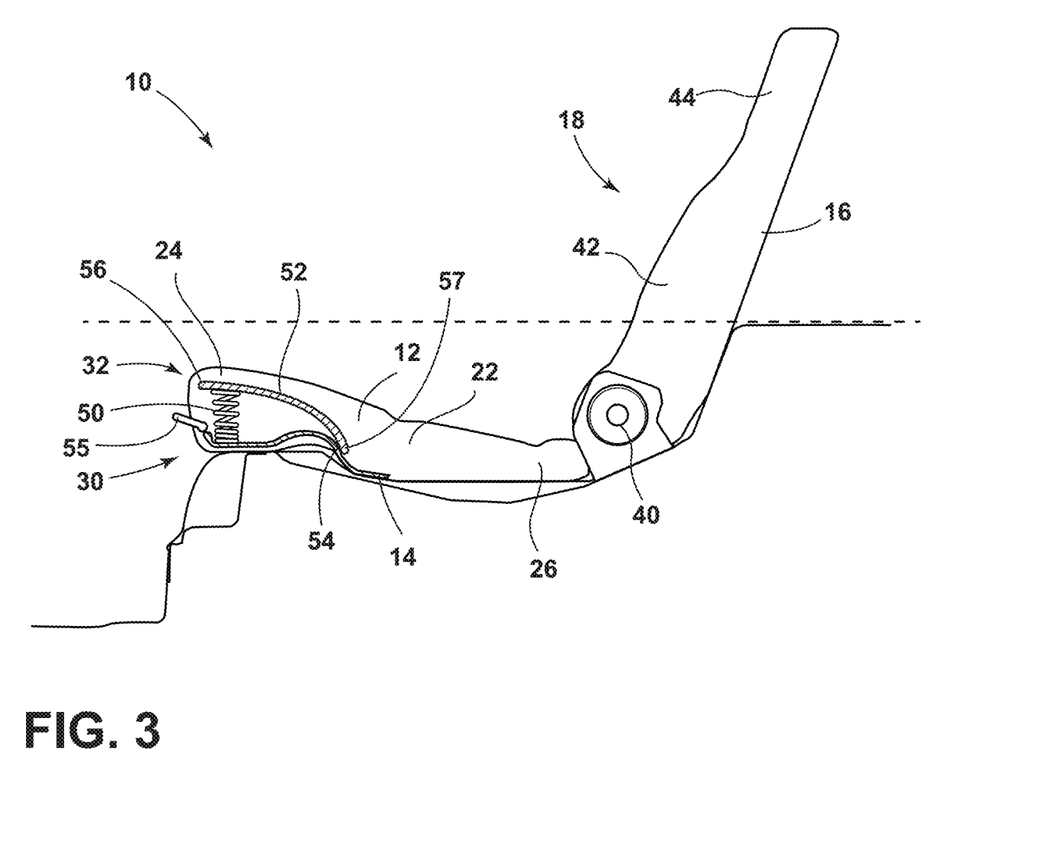
FIG. 3 is another side elevational view of a vehicle seating assembly with a seatback in a passenger support position and an articulation feature in a deployed position.

With reference now to FIGS. 1-3, the vehicle seating assembly 10 as set forth herein is generally configured for use as rear seating for a vehicle. It is contemplated that the vehicle may be a sport utility vehicle, a van, a car, etc. It will also be contemplated that the support frame 14 could take on a variety of constructions, and is not limited to the structure as set forth herein. Further, the concept as set forth herein can be applied to bench-type seating, 40/60 seating, or any other vehicle seating arrangement, as understood by one having ordinary skill in the art. As shown in FIG. 1, the vehicle seating assembly 10 may also include a headrest 36, seatbelt assemblies 37, and various other components generally found in a backseat of a vehicle.

With reference now to FIGS. 2 and 3, the illustrated embodiment includes a recliner heart 40 about which the seatback 16 can rotate relative to the seat 12. In the illustrated embodiment, the recliner heart 40 is configured to allow rotation of the seatback 16 to rotate forward to a substantially horizontal position, such that the seatback 16 is adjacent to and in abutting contact with the seat 12, and more specifically, to the seat cushion 22. In the illustrated embodiment, the seatback 16 includes a lower seatback 42 that is deeper than an upper seatback 44. This construction is generally complementary to the seat 12. More specifically, the forward portion 24 of the seat cushion 22 is thicker than the generally static rearward portion 26. As a result, when the seatback 16 is folded forward to a substantially horizontal position, the front face of the seatback 16 generally conforms to and is complementary with the seat 12. To aid in reaching a substantially horizontal position, the articulation feature 30 moves from the deployed position 32 (FIG. 2) to the non-deployed position 34 (FIG. 3). In the embodiment illustrated in FIGS. 2 and 3, the articulation feature 30 includes a compression spring 50. The compression spring 50 compresses when the seatback 16 moves to the horizontal position. It is generally contemplated that the weight of the seatback 16 may compress the compression spring 50. However, the compression spring 50 may be moved to the non-deployed position 34 via a motorized unit, a ratcheting system, etc., configured to draw down the dynamic forward portion 24 of the seat cushion 22 to accommodate for the seatback 16 when placed in the horizontal position. Notably, the articulation feature 30, which in this case is the compression spring 50, is generally positioned between the seat frame 14 and a dynamic member 52. The dynamic member 52 generally defines a rigid cushion support and moves as part of the dynamic forward portion 24 of the seat cushion 22 when the articulation feature 30 moves between the deployed position 32 and the non-deployed position 34. The dynamic member 52 may be constructed from a flexible material, including, but not limited to, polymers, metals, etc. In addition, the dynamic member 52 may be coupled with the seat frame 14 via a weld, an epoxy, mechanical fasteners, etc. In the illustrated embodiment, the dynamic member 52 is connected to the seat frame 14 at a rearward junction 54. The resulting seating assembly provides a comfortable seating surface for a passenger and can be easily converted to a cargo space, when desired.

Figure 3A:
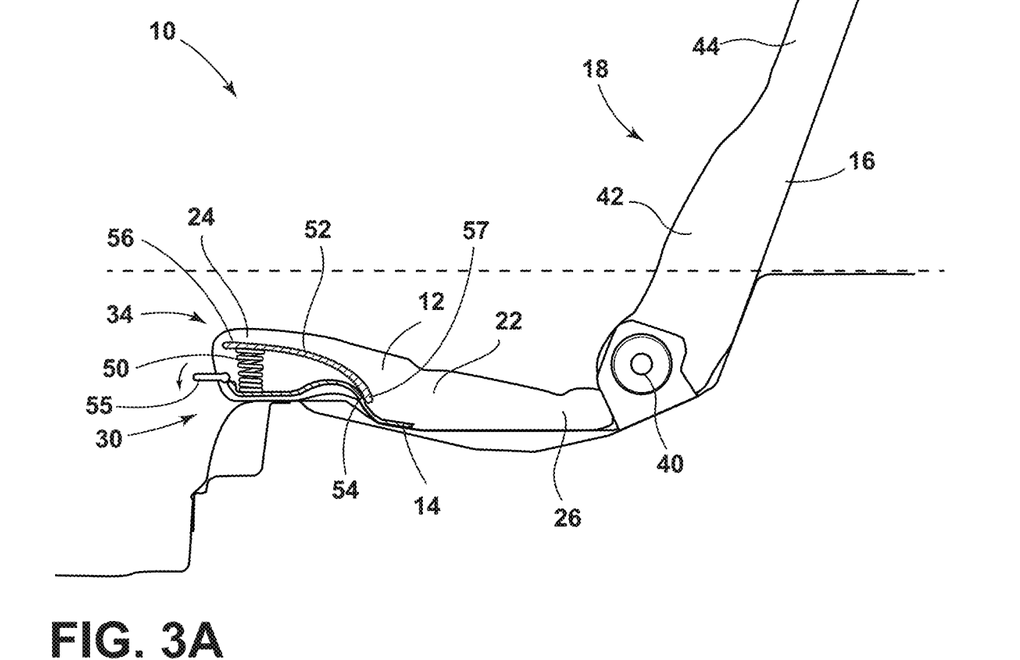
FIG. 3A is another side elevational view of a vehicle seating assembly with a seatback in a cargo position and an articulation feature moving to a non-deployed position.
Figure 3B:
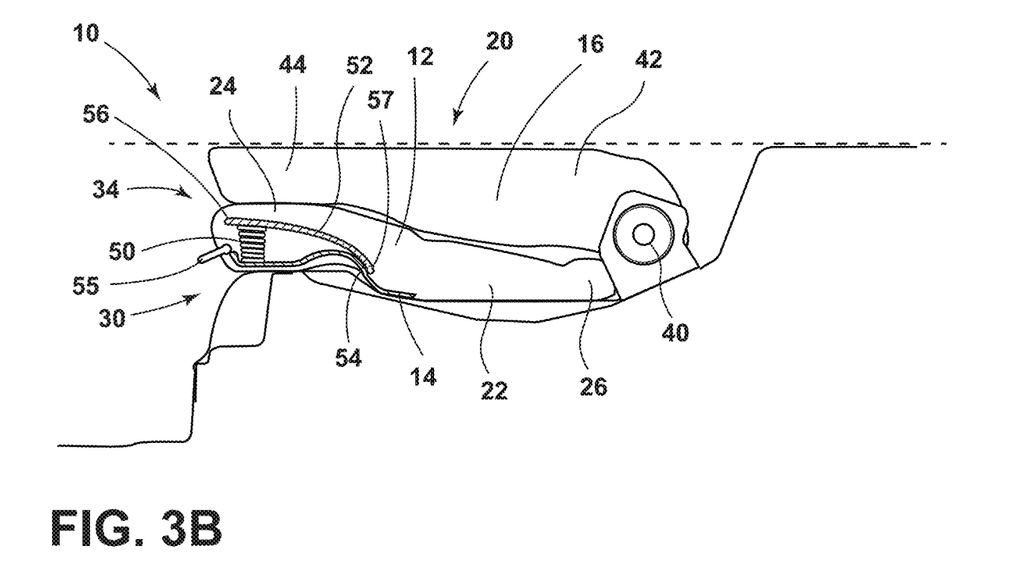
FIG. 3B is another side elevational view of vehicle seating assembly with a seatback in a cargo position and an articulation feature in a non-deployed position.

With reference now to FIGS. 3-3B, it is also contemplated that a lever 55, which generally defines an activation device for the vehicle seating assembly 10, can be adjusted to lower the articulation feature 30 from the deployed position 32 to the non-deployed position 34. As illustrated, the lever 55 is adjusted prior to the seatback 16 being moved to the cargo position 20. It is also generally contemplated that the lever 55 could be replaced with a motorized system, wherein a switch activates a motor that draws down the dynamic member 52, and consequently lowers the articulation feature 30 to accommodate the seatback 16 when moved to the cargo position.

Figure 4:
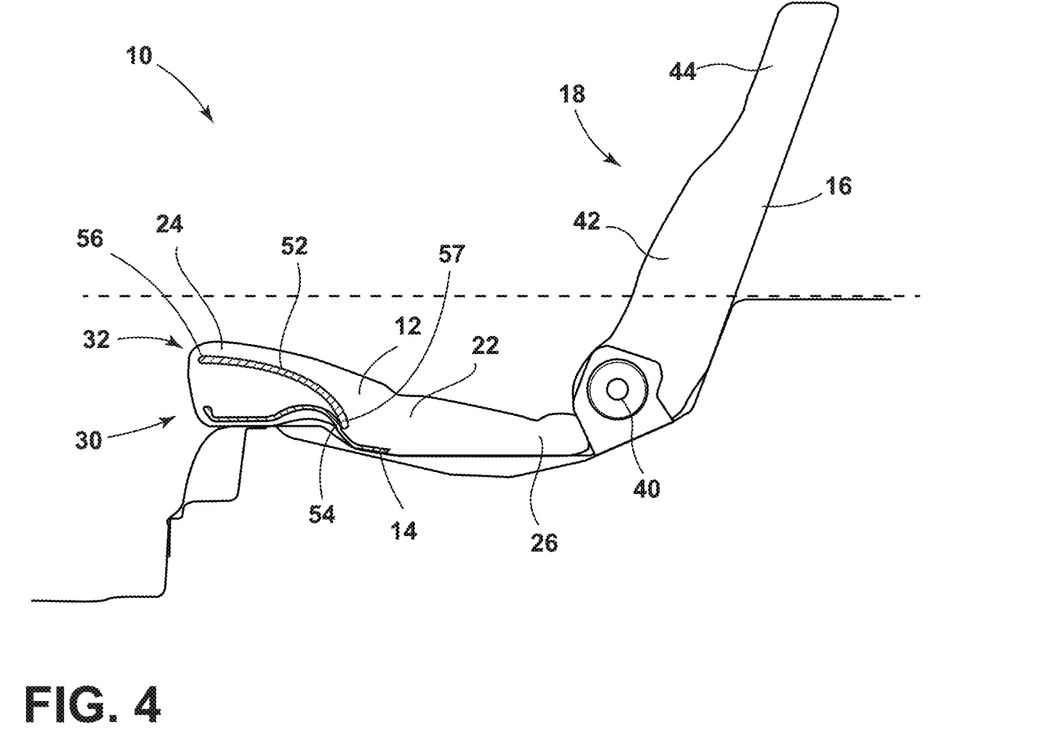
FIG. 4 is a side elevational view of a vehicle seating assembly with a seatback in a passenger support position and an articulation feature in a deployed position.
Figure 5:
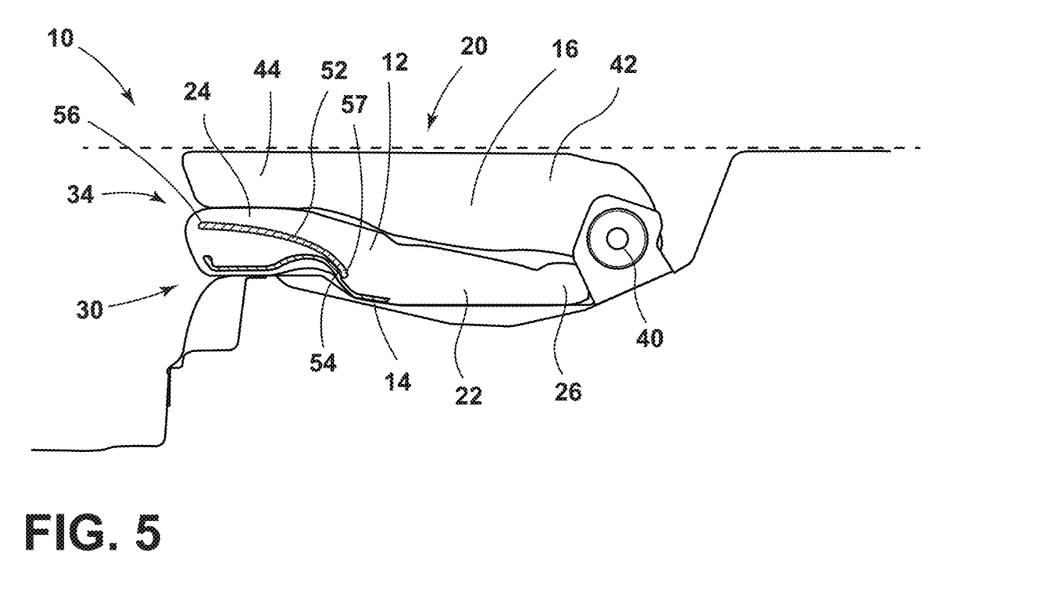
FIG. 5 is another side elevational view of a vehicle seating assembly with a seatback in a cargo position and an articulation feature in a non-deployed position.

With reference now to FIGS. 4 and 5, it is also contemplated that the vehicle seating assembly 10 may be utilized with only the dynamic member 52 and seat frame 14. As illustrated, the dynamic member 52 includes a forward distal end 56 that vertically adjusts and a rearward proximal end 57 that is operably coupled to the seat frame 14 at the rearward junction 54. As shown in FIGS. 4 and 5, the dynamic member 52 and the connection of the dynamic member 52 with the seat frame 14 is such that the dynamic member 52 can flex downward (FIG. 5) when the seatback 16 is moved to the horizontal position. In this instance, the dynamic member 52 defines a composite support that may be constructed from polymers, metals, or both. It is contemplated that the dynamic member 52 can be drawn down by the weight of the seatback 16, or by a mechanical member that is manually or automatically actuated when a passenger desires to move the seatback 16 to the cargo position 20. It is generally contemplated that the dynamic member 52 will be constructed of a resilient material, such as spring steel or an elastic polymer, such that the dynamic member 52, and consequently, the articulation feature 30, is biased to the raised position associated with the passenger support position 18.

Figure 6:
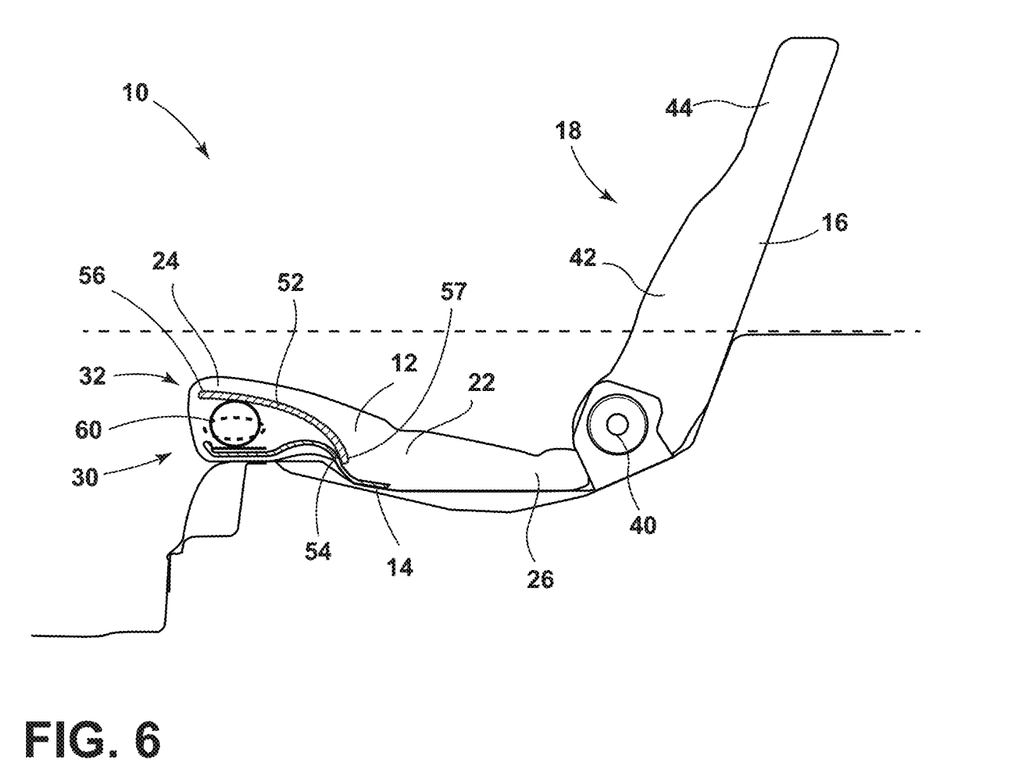
FIG. 6 is another side elevational view of a vehicle seating assembly with a seatback in a passenger support position and an articulation feature in a deployed position.
Figure 7:
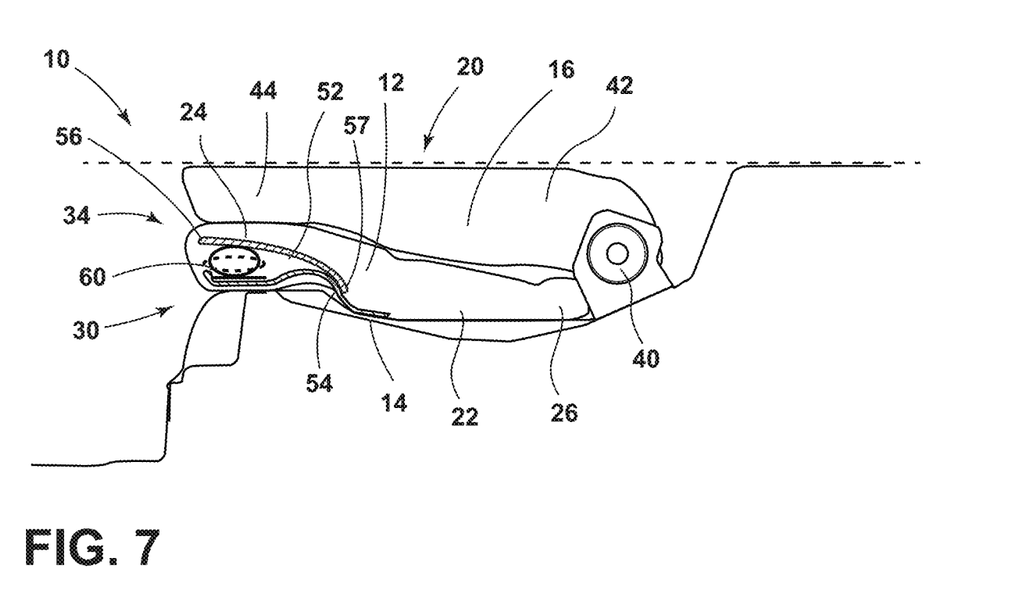
FIG. 7 is yet another side elevational view of a vehicle seating assembly with a seatback in a cargo position and an articulation feature in a non-deployed position.

With reference now to FIGS. 6 and 7, in another embodiment, one or more spring steel supports 60 may be positioned between the dynamic member 52 and the seat frame 14. It is contemplated that the spring steel supports 60 may be disposed directly below the dynamic member 52, and are urged downward under the weight of the seatback 16, or as previously noted, with regard to the embodiments illustrated in FIGS. 2-5, the spring steel supports 60 may be urged downwardly manually by a passenger or by an automatic system that may include a motor.

Figure 8:
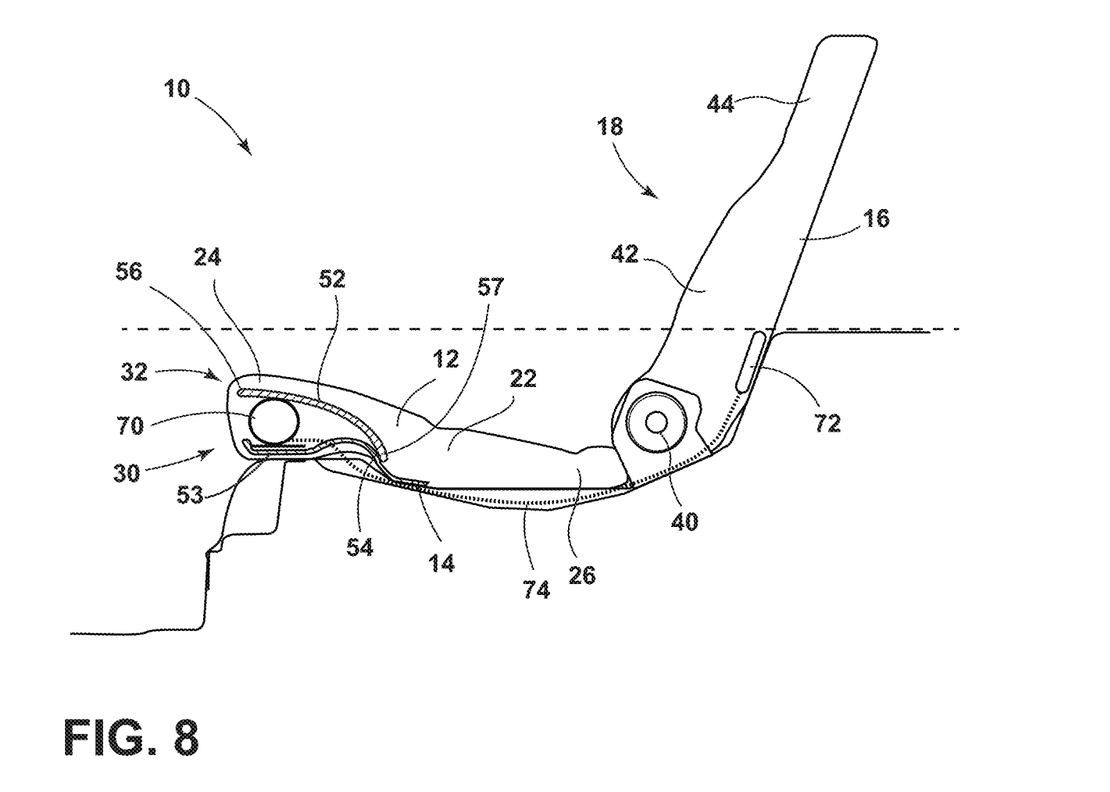
FIG. 8 is a yet another side elevational view of a vehicle seating assembly with a seatback in a passenger support position and an articulation feature in a deployed position.
Figure 9:
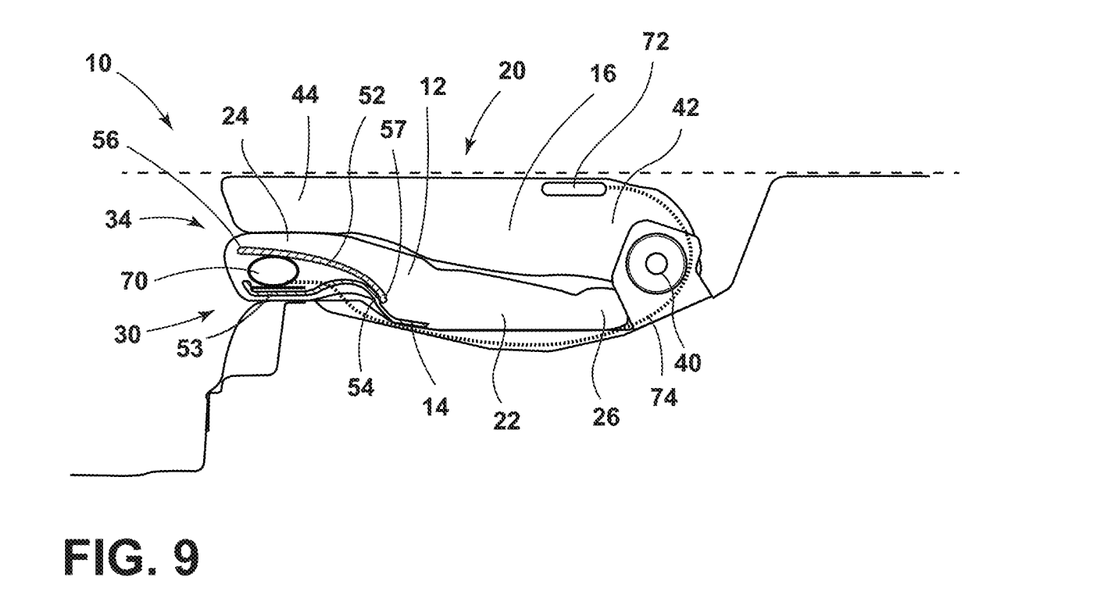
FIG. 9 is still another side elevational view of a vehicle seating assembly with a seatback in a cargo position and an articulation feature in a non-deployed position.

With reference now to FIGS. 8 and 9, in another embodiment, the articulation feature 30 includes an air bladder 70 that is operably connected with a bladder pump 72 via a bladder inflation and deflation line 74. In this embodiment, the air bladder 70 can be adjusted and inflated to provide sufficient support to the forward portion 24 of the seat cushion 22 and support the backs of the legs of a passenger. When the passenger desires for the seatback 16 to move to the cargo position 20, the passenger simply urges the seatback 16 downward and the bladder pump 72 can automatically or manually be activated to allow air to leave the air bladder 70 via a valve proximate the air bladder 70 or through the inflation and deflation line 74. It is also contemplated that a passenger can adjust the height and/or rigidity of the forward portion 24 of the seat cushion 22 by activating the bladder pump 72. In this manner, the passenger can adjust the forward portion 24 of the seat cushion 22 to a desired setting. A static member 53 and the dynamic member 52 are disposed within the seat 12 and the air bladder 70 is disposed therebetween.

Figure 10:
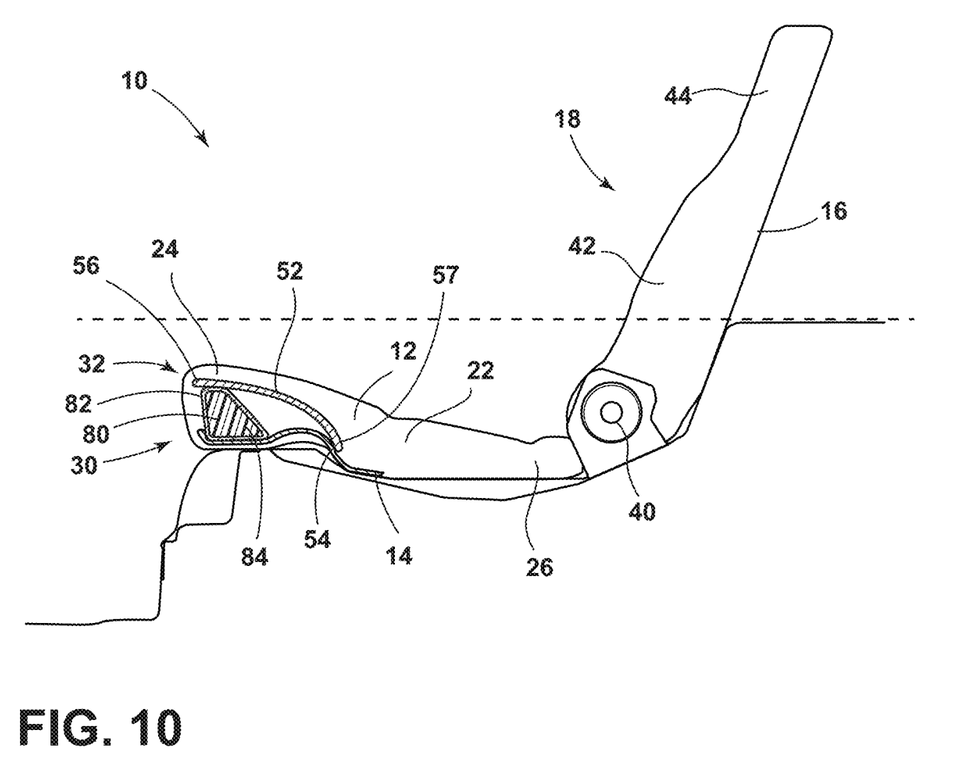
FIG. 10 is still another side elevational view of a vehicle seating assembly with a seatback in a passenger support position and an articulation feature in a deployed position.
Figure 11:
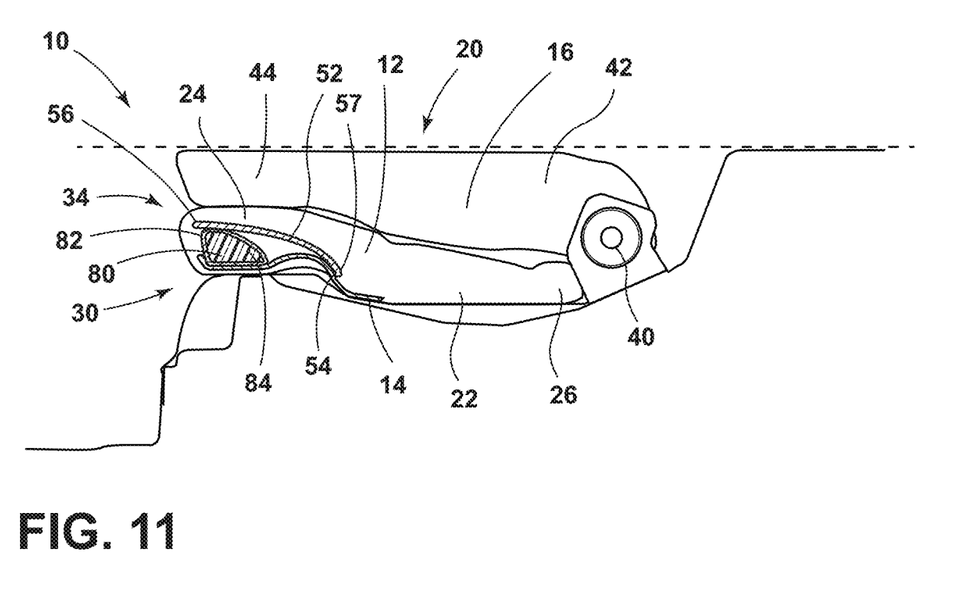
FIG. 11 is still another side elevational view of a vehicle seating assembly with a seatback in a cargo position and an articulation feature in a non-deployed position.

With reference now to FIGS. 10 and 11, in yet another embodiment, a polymeric composite support member 80 is positioned between the dynamic member 52 and the seat frame 14. The polymeric composite support member 80 includes an outer durable shell 82 that extends around a foam core having a high degree of resilience. In addition, the foam core is configured to be compressed when the seatback 16 is folded forward to a substantially horizontal position, resulting in the seatback 16 being in the cargo position 20. It is contemplated that when the seatback 16 is moved back to the passenger support position 18, the polymeric composite support member 80 returns to its original shape to provide support to the legs of a passenger seated on the vehicle seating assembly 10.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising: a seatback pivotally coupled with a seat and adjustable between a passenger support position and a cargo position, the seatback including a fluid pump; a seat cushion including a forward portion that is vertically adjustable between a raised position when the seatback is in the passenger support position and a lowered position when the seat back is in the cargo position; an articulation feature that moves the forward portion to the raised position; wherein the articulation feature includes a bladder positioned between a frame of the seat and a dynamic member that is operably coupled to a forward portion of the frame, wherein the bladder is in fluid communication with the fluid pump, and wherein the articulation feature is expandable and vertically adjustable between: a raised position when the seatback is in the passenger support position; and a lowered position when the seatback is in the cargo position.

2. The vehicle seating assembly of claim 1, wherein the articulation feature moves to the non-deployed position under the weight of the seatback.

3. The vehicle seating assembly of claim 1, wherein the articulation feature includes a spring steel support that is elastically deformable to the non-deployed position under the weight of the seatback when the seatback is in the cargo position.

4. The vehicle seating assembly of claim 1, wherein the bladder of the articulation feature inflates to move to the deployed position and deflates to move to the non-deployed position.

5. The vehicle seating assembly of claim 1, wherein the articulation feature includes a polymeric composite support that is elastically deformable to the non-deployed position under the weight of the seatback when the seatback is in the cargo position.

6. A vehicle seating assembly comprising:
   a seatback pivotally coupled with a seat and adjustable between a passenger support position and a cargo position; and
   a seat cushion including a dynamic forward portion supported by a flexible articulation feature, wherein the articulation feature is positioned between a frame of a seat and a flexible dynamic member that is operably coupled to a forward portion of the frame, and wherein the flexible articulation feature is expandable and vertically adjustable between:
      a raised position when the seatback is in the passenger support position; and
      a lowered position when the seatback is in the cargo position.

7. The vehicle seating assembly of claim 6, wherein the articulation feature includes a spring steel support that is elastically deformable to a non-deployed position under the weight of the seatback when the seatback is in the cargo position.

8. The vehicle seating assembly of claim 6, wherein the articulation feature includes an inflatable air bladder that inflates to move to a deployed position and deflates to move to the non-deployed position.

9. The vehicle seating assembly of claim 6, wherein the articulation feature moves to the non-deployed position under the weight of the seatback.

* * * * *

UNITED STATES PATENT AND TRADEMARK OFFICE
CERTIFICATE OF CORRECTION

PATENT NO. : 10,829,017 B2  
APPLICATION NO. : 15/937633  
DATED : November 10, 2020  
INVENTOR(S) : Line et al.

Page 1 of 1

It is certified that error appears in the above-identified patent and that said Letters Patent is hereby corrected as shown below:

In the Claims

Column 8:  
Claim 6, Line 3:  
Delete "frame of" and insert --static member within--.  
Claim 6, Line 4:  
After "dynamic member" insert --, wherein the static member and the flexible dynamic member are--.  
Claim 6, Line 5:  
Delete "to a forward portion of the" and insert --at a rearward junction within the seat above a--.  
Claim 6, Line 5:  
After "frame" insert --of the seat--.

Signed and Sealed this  
Fifth Day of January, 2021

Andrei Iancu  
*Director of the United States Patent and Trademark Office*